United States Patent [19]

Hungerford

[11] 4,386,897

[45] Jun. 7, 1983

[54] SYSTEM FOR RECOVERING FILM FROM PRESSURIZED EXTRUSION ZONE

[75] Inventor: Gordon P. Hungerford, Palmyra, N.Y.

[73] Assignee: Mobil Oil Corporation, New York, N.Y.

[21] Appl. No.: 313,102

[22] Filed: Oct. 20, 1981

Related U.S. Application Data

[62] Division of Ser. No. 156,708, Jun. 5, 1980, Pat. No. 4,321,230.

[51] Int. Cl.³ .............................................. B29C 25/00
[52] U.S. Cl. ...................................... 425/71; 425/224
[58] Field of Search ...................................... 425/71–75, 425/223, 224; 264/203, 182, 206, 212, 188, 216, 264/178 R

[56] References Cited

U.S. PATENT DOCUMENTS

| | | | |
|---|---|---|---|
| 2,037,292 | 4/1936 | Weihe | 264/203 |
| 2,077,836 | 4/1937 | Herndon | 264/188 |
| 2,578,635 | 12/1951 | Pierrat et al. | 425/72 |
| 3,341,645 | 9/1967 | Hoyiuchi et al. | 264/196 |
| 3,527,851 | 9/1970 | Bulgin | 425/72 |
| 3,842,151 | 10/1974 | Stoy et al. | 264/203 |
| 3,890,074 | 6/1975 | Fritsch | 425/71 |
| 4,234,431 | 11/1980 | Mishiro et al. | 264/203 |
| 4,301,112 | 11/1981 | Zuick | 264/211 |

*Primary Examiner*—Jay H. Woo
*Attorney, Agent, or Firm*—Charles A. Huggett; James F. Powers, Jr.; James P. O'Sullivan, Sr.

[57] ABSTRACT

Continuous film production from a high pressure feed stream is achieved in a system which provides methods and means for maintaining pressurized gas in an extrusion zone wherein the extrudate may be cooled to form a solid polymeric film. The product film is withdrawn from the extrusion zone continuously through a standing liquid column in fluid communication with the extrusion zone. The film is passed downwardly into a liquid leg below the extrusion zone and upwardly through the liquid column, which has an upper exit end elevated above the pressurized zone thereby exerting super-atmospheric pressure. The product is recovered from the liquid sealing medium, advantageously water, at ambient pressure. Hot aqueous solutions of polyacrylonitrile may be extruded at elevated pressure onto a cooled casting drum in a gaseous environment wherein flashing of the hot solvent is prevented.

6 Claims, 1 Drawing Figure

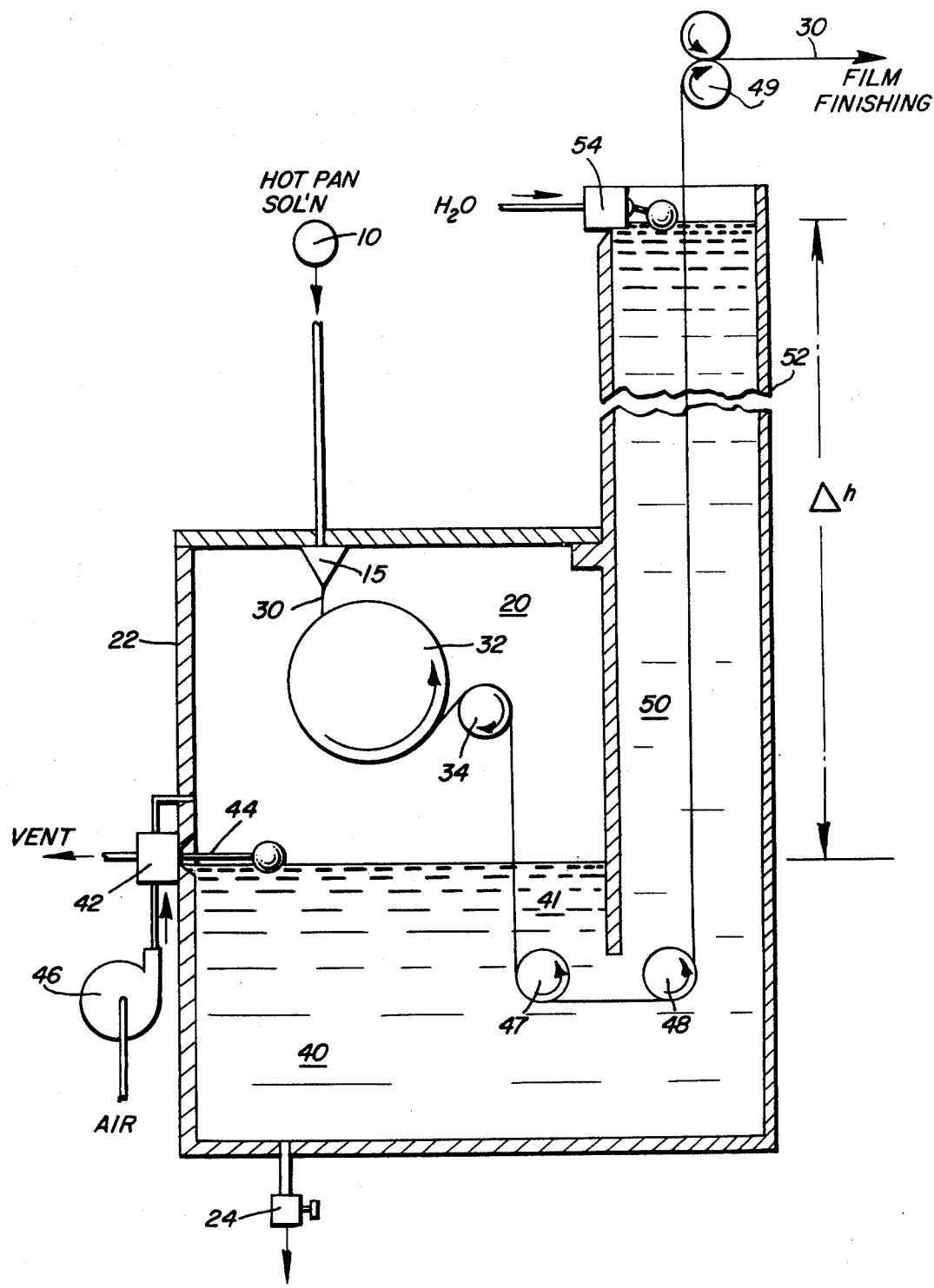

SYSTEM FOR RECOVERING FILM FROM PRESSURIZED EXTRUSION ZONE

This is a division of application Ser. No. 156,708 filed June 5, 1980 now U.S. Pat. No. 4,321,230.

BACKGROUND OF THE INVENTION

This invention relates to a system for manufacturing film products using a technique for casting film from a hot mixture of resin and volatile liquid in a pressurized extrusion zone. The system involves a novel process for recovering hot-extruded polyacrylonitrile (PAN) film or the like from an extrusion zone without mechanical seals between ambient pressure and the pressurized extrusion zone.

Prior methods for producing hot extruded PAN films or the like have not been successful when employing coagulant baths, largely due to uneven and irregular coagulation, resulting in microscopic voids or pores, reducing the strength and transparency of the product. Coagulant techniques often produce an outer skin, which may produce contraction differences during solvent removal, resulting in a corrugated or puckered extrusion product.

Production of optically-clear polyacrylonitrile (PAN) film from hot aqueous solutions of PAN has proven difficult in past attempts. It is known that many polymers containing large amounts of acrylonitrile repeating units, especially the homopolymer, are soluble in water at elevated temperature. The high vapor pressure of the aqueous solvent at equilibrium requires a large pressure to be exerted on the hot solution from a high pressure orifice. Abrupt pressure reduction can cause flashing of the solvent, wherein water vaporizes in the cast material and expands rapidly. This phenomenon causes film disruptions, destroying the optical and mechanical properties of the resulting film and introducing discontinuities in the product which adversely affect molecular orientation and gas barrier characteristics.

If the extrudate is cooled immediately as it reaches the extrusion zone, while the zone is maintained above a certain pressure to prevent flashing, the vapor pressure of the volatile solvent is decreased as a function of the film temperature. In U.S. Pat. No. 2,585,444, it is suggested that aqueous PAN extrudates be coagulated under pressure in a receiving cell.

While the expedient of maintaining an extrusion chamber under pressure is effective in preventing solvent flashing, it introduces a problem in recovering the product. Because the film, or similar extruded shape, is made continuously to produce a strip of coagulated polymer, product recovery from the pressurized extrusion zone is difficult. Various mechanical seals, usually including rollers, wiping seals and the like, may be employed to pass the continuous film from high pressure to ambient. Contacting the film with mechanical handling equipment tends to mar its surface, resulting in unacceptable product.

It is known that water can form hydrate with nitrile groups in acrylonitrile polymers. When the polymer consists essentially of PAN homopolymer, about 33 parts by weight of water per hundred parts of polymer are required to give complete hydration. A melt-extrusion mixture containing more than the hydrating amount of water is maintained under at least autogenous pressure to prevent formation of bubbles. Since the aqueous PAN melt composition is formed at relatively high temperatures, i.e. above about 180° C., free water must be highly pressurized to prevent vaporization. Accordingly, extrusion of acrylonitrile polymers containing more than 25% $H_2O$, based on total water-acrylonitrile content, are subject to flashing when the pressure is reduced during extrusion. It is an object of the present invention to prevent disruption of the extrudate by vaporization of volatile components by providing a back pressure in the extrusion zone and recovering the extruded shape after cooling at ambient pressure.

BRIEF SUMMARY OF THE INVENTION

It has been found that melt-extrudate processes can be operated successfully by applying a back pressure at the extrusion orifice wherein a gaseous environment is maintained. A system has been devised for producing continuous film from a high pressure feed stream comprising means for feeding a polymer-solvent mixture under pressure to melt-extrudate forming means in the extrusion zone, along with means for maintaining superatmospheric pressurized gas in the extrusion zone. Operatively connected to the extrusion zone is product withdrawal means for recovering polymer from the forming means as a continuous film. The product withdrawal means comprises a standing liquid column in fluid communication with the extrusion zone and adapted to receive a continuous supply of the film at a lower portion of the column. Handling rolls provide means for passing the continuous film upwardly through the liquid column at the top of which it is at ambient pressure. A preferred embodiment includes means for directing the pressurized hot polymer-solvent mixture in the extrusion zone onto a film-supporting cooled surface, such as against adjacent rotating drum means, for casting a substantially uniform continuous film of the polymer. The drum means may include means for cooling the polymer-solvent mixture to form a solid polymeric film. The polymeric film is stripped from the drum and passed to the liquid column lower portion. Gas in the extrusion zone is maintained in predetermined amount by controlling liquid level at an interface between the pressurized gas and the lower portion or liquid leg. Liquid level control means can include a source of high pressure inert gas operatively connected through valve means responsive to liquid level for injecting high pressure gas into the extrusion zone.

The process of this invention is advantageous in forming hydrogel extrusions which consist essentially of acrylonitrile homopolymer and water. Typically, the polymer and water are extruded from a melt having temperature above about 200° C., and cast as continuous film onto a chilled roll maintained at a temperature of about 5° C. to 25° C. in a chamber maintained at about 3 to 4 atmospheres by hydrostatic pressure.

BRIEF DESCRIPTION OF THE DRAWING

The FIGURE is a schematic representation of the invention, showing a vertical cross-sectional view of film manufacturing apparatus.

DESCRIPTION OF PREFERRED EMBODIMENTS

Referring to the drawing, a mixture of hot polymer and volatile solvent is provided to the system through pump 10 and passed via extrusion die 15 into an extrusion zone 20, which may be maintained under super-atmospheric pressure in a closed chamber 22. Extrusion means 15 may be a sheeting die having a straight thin orifice with an opening of about 200 microns or more. A continuous extrusion film 30 is directed toward a chilled roll 32 which is rotated at a speed coordinated with the rate of extrusion. The film-forming polymer and solvent are cooled quickly by the rotary drum or roll to form a self-supporting film which can be stripped by reverse roll 34 and passed downwardly into a liquid 40. Level control means 42, which may include a float 44 and valve means, senses liquid level in the chamber 22 and admits a high-pressure gas from a suitable source of inert gas, such as air compressor 46. The level control 42 may function to vent excess gas from the chamber. Liquid may be withdrawn through valve 24.

The stripped film is passed by film handling means 47, 48 from a downward travel in reverse direction upwardly through a standing liquid column, such as water, which reduces pressure on the product film as it passes upwardly therethrough. The liquid column is contained within an open-topped tower 52, which extends above the elevation of the chamber liquid level to create a static head $\Delta h$ due to height differential. Water or other liquid may be introduced at the top of the column 50 by suitable feed means, such as float-type liquid level control 54. The film is recovered from the pressure-reducing liquid at ambient pressure and passed to the film finishing stages of production. The liquid column 50 exerts pressure in the chamber 22 by fluid communication through liquid leg portion 41.

The liquid level in chamber 22 need not be fixed at a particular position. For certain applications it is desirable to have the cooling means/rotary drum section entirely above the liquid, and in other cases partially submerged to assist in the film treatment. Level controls of various types may be employed. For instance, the gas-liquid interface may be detected and controlled by a differential pressure device, as disclosed in U.S. Pat. No. 3,497,913. The gaseous environment of the extrusion zone may be air or other inert gas. It can be admitted from a storage tank or reservoir having greater pressure than the extrusion zone. Controlled generation of the gas within the chamber is also possible. In steady state operation, once a predetermined volume of gas or level is obtained, only slight loss would be expected in a tightly sealed system. Gradual dissolution of the gas, especially in water, would require intermittent addition of gas to the chamber to prevent increased liquid level.

The polymer-solvent mixture may be prepared by conventional methods, as disclosed in U.S. Pat. No. 3,984,601, for instance. Polyacrylonitrile hydrate of intrinsic viscosity 1.84 containing at least about 33 wt% $H_2O$ can be extruded into a hydrogel film from a melt temperature of about 210° C. onto cooled rotary drum means. The drum is surrounded by a vapor-saturated air atmosphere maintained at about 3–4 atmospheres (30–45 psig) by hydrostatic head, according to the present invention.

In a preferred embodiment of the invention, acrylonitrile homopolymer is mixed with water in an autoclave equipped with high shear mixing means and heated until the polymer enters solution. The aqueous PAN solution is extruded onto a casting drum maintained above 0° C. to prevent freezing the water component. The film is cast at about 25 microns thickness (1 mil) and the solidified film is stripped from the rotating drum continuously. The self-supporting film is then transferred into the pressure reducing liquid column and recovered at ambient pressure.

The liquid pressure-reducing column and its leg extending to the extrusion zone may be filled with water or other compatible liquid. Mercury can be advantageous in that its high specific gravity provides adequate pressure for a shorter column height. Other liquid metals, such as gallium, or organic liquids can be used, provided the film integrity is not damaged.

The column may have a circular cross-section, or rectangular columns sufficient to accommodate the film and its guides may be employed. The column height may be varied by controlling liquid level therein to change the back pressure in the extrusion zone. To maintain such pressure at about 4 atmospheres, about 30 meters (100 feet) of elevation difference is required using water or similarly dense liquid.

As the extrudate leaves the sheeting die, the resin-liquid mixture is cooled as it contacts the casting drum and/or gaseous environment. Advantageously, the rotating drum is maintained at the desired temperature by circulating refrigerant in the interior surface, directing the coolant toward the interior drum surface. Ingress and egress of fluids through the hub of the drum in known manner provides efficient heat transfer for the extruded film. The gaseous environment may also be cooled by appropriate auxiliary refrigerants. If the extrudate contacts the liquid sealing medium at excessive temperature differential, film warping may occur.

Polymers that are particularly useful for hot extrusion with a volatile solvent are high-nitrile materials, preferably containing at least 80% acrylonitrile repeating units. Homopolymer PAN, copolymers and interpolymers with hydrophilic ethylenically-unsaturated monomers, such as acrylic acids and esters, etc., are well adapted to the novel process and apparatus. Typical high-nitrile polymers are disclosed in U.S. Pat. Nos. 2,585,444, 3,873,508, 3,896,204, 3,984,601 and 4,053,442, incorporated herein by reference. While emphasis is placed on those polyacrylonitrile materials which are comprised of very high nitrile content due to the presence of acrylonitrile repeating units in the polymeric chain, it is understood that the inventive concept can be employed with other film-forming polymers which are extruded with a volatile solvent at elevated temperature and pressure. Block copolymers of acrylonitrile and acrylamide and/or other ethylenically-unsaturated monomers, such as acrylic acid can be shaped by hot extrusion with aqueous media to form fibers, films or other extruded shapes.

In the preferred embodiments for acrylonitrile polymers, the major portion of volatile solvent is water. Minor amounts of compatible organic solvents may be incorporated without deleterious affects. For instance, 0 to 10 percent by weight of dimethyl sulfoxide, tetramethylene sulfone, dimethyl formamide may be included advantageously in a single phase melt extrudate. Residual organic solvent can be washed from the extruded product by water in the pressure-reducing section of the apparatus.

While the invention has been described by specific embodiments, there is no intent to limit the inventor's concept except as set forth in the following claims.

I claim:

1. A system for producing continuous acrylonitrile polymer film from a high pressure feedstream comprising, in combination:

means for feeding an acrylonitrile polymer-solvent mixture under pressure through a film forming means into an extrusion zone;

means for maintaining super-atmospheric pressurized gas in said extrusion zone;

means for directing said polymer-solvent mixture in film form against adjacent rotating drum means in said extrusion zone for casting a substantially uniform continuous film of polymer;

product withdrawal means operatively connected to said extrusion zone for recovering said film from said drum means, said product withdrawl means comprising a standing liquid column in fluid communication with said extrusion zone and adapted to receive a continuous supply of said film at a lower portion of said column; and means for passing said continuous film upwardly through said liquid column and recovering said film at ambient pressure.

2. The system of claim 1 wherein said drum means includes means for cooling said polymer-solvent mixture to form a solid polymeric film, and means for stripping said polymeric film from said drum means and passing said polymeric film to said liquid column lower portion.

3. The system of claim 1 including means for controlling liquid level at an interface between said pressurized gas and said lower portion of said column.

4. The system of claim 3 wherrein said level control means comprises a source of high pressure gas operatively connected through valve means responsive to liquid level for injecting said high pressure gas into said extrusion zone.

5. The system of claim 1 wherein said forming means comprises a sheeting die mounted adjacent cooled rotary drum means for receiving said film, thereby producing a solidified self-supporting polymeric film, and means for stripping said film from said drum.

6. The system of claim 5 comprising film handling roll means immersed in said liquid for receiving said film stripped from said drum and passing said film through said standing liquid column.

* * * * *